United States Patent [19]

Miller, Jr.

[11] 4,032,446

[45] June 28, 1977

[54] WASTE MATERIAL HANDLING SYSTEM

[75] Inventor: Blaine Monroe Miller, Jr., Malvern, Pa.

[73] Assignee: Hobart Corporation, Troy, Ohio

[22] Filed: May 5, 1976

[21] Appl. No.: 683,475

[52] U.S. Cl. .............................. 210/152; 4/DIG. 4; 137/567; 210/173; 210/196; 241/42; 241/79; 241/DIG. 38

[51] Int. Cl.[2] .................... B01D 35/00; C02C 3/00; B02C 23/08

[58] Field of Search .............. 210/173, 174, 67, 65, 210/196, 152, 251; 100/37, 97; 137/566, 567; 417/87, 89; 4/DIG. 4; 162/254

[56] References Cited

UNITED STATES PATENTS

| | | | |
|---|---|---|---|
| 3,191,872 | 6/1965 | Dyson | 100/97 X |
| 3,457,863 | 7/1969 | Carter | 417/89 X |
| 3,551,073 | 12/1970 | Petrovits | 417/87 X |
| 3,773,437 | 11/1973 | Suman, Jr. | 417/87 |
| 3,835,478 | 9/1974 | Molus | 137/567 X |
| 3,875,462 | 4/1975 | Kiefer et al. | 241/46 A X |

*Primary Examiner*—Joseph Scovronek
*Assistant Examiner*—Roger F. Phillips

[57] ABSTRACT

An improved waste material handling system includes a plurality of waste food disposer units which are operable to disintegrate waste food materials to form a slurry. The system also includes a pulper unit which is operable to disintegrate solid waste materials, such as paper, cardboard boxes, plastic bags, etc., to form a slurry. The waste material slurry is conducted from the waste food disposer units and pulper unit to a press which extracts water from the slurry. To prevent the discharge of waste material slurry from an active one of the waste food disposer units to an inactive one of the waste food disposer units and/or the pulper unit, check valves are associated with each of the waste food disposer units and the pulper unit. A pump is also associated with each of the waste food disposer units and the pulper unit to promote a flow of slurry from the units to the press. Eductors having jet assist nozzles are advantageously utilized to direct a flow of fluid toward the inlet of the pumps associated with the waste food disposer units to promote a flow of slurry from an associated waste food disposer unit to the pump. The amount of water required during operation of the system tends to be minimized by utilizing a pump to supply the eductors with water removed from the waste material slurry by the press. Since it is contemplated that the waste food disposer units may be activated at different times, control valves are provided to enable the water from the press to be directed to only an eductor which is associated with an active waste food disposer unit.

11 Claims, 4 Drawing Figures

WASTE MATERIAL HANDLING SYSTEM

BACKGROUND OF THE INVENTION

This invention relates generally to a new and improved waste material handling system and more specifically to a waste material handling system in which a plurality of food waste disposer units are operable to form food waste material slurry which is directed to a single press which extracts water from the slurry. A pulper unit for forming solid waste material slurry is advantageously utilized in association with the food waste disposer units and press.

Food waste disposer units or garbage grinders are commonly utilized to form slurries of waste food. The waste food slurry from a garbage disposal unit is usually directed into a sewer system. However, in certain areas the dumping of waste food slurries from garbage disposal units into the sewer system is objectionable.

Waste paper and other solid waste materials have previously been disposed of by using pulpers to form slurries of waste material. A pulper has frequently been associated with a press which removes at least part of the water from the waste paper slurry to form a wet paper pulp which is transported to a suitable disposal area. Two known waste paper handling systems are disclosed in U.S. Pat. Nos. 2,970,776 and 3,784,116. The waste material handling systems disclosed in both of these patents include a pulper which is effective to disintegrate solid paper waste material and form a slurry which is conducted to an associated press.

SUMMARY OF THE PRESENT INVENTION

The present invention provides an improved waste material handling system including a plurality of food waste disposer units which are operable to form food waste materials into a slurry. This slurry is directed to a single press utilized to extract water from the waste material slurry supplied to the press. Since the food waste disposer units are connected in parallel, check valves are provided in association with each of the disposer units to prevent a waste material slurry discharged from one of the units from flowing into the other units. In the absence of an associated check valve, a food waste disposer unit tends to discharge an objectionable spray of liquid upon initiation of operation of the waste food disposer unit.

The flow of slurry from each of the waste food disposer units to the press is promoted by a pump which is effective to pump the waste material slurry toward the press. Due to the operating characteristics of the food waste disposer units, a substantial quantity of air is entrained in the slurry discharged from a food waste disposer unit. The air entrained in the slurry tends to cause cavitation of the pump associated with a food waste disposer unit. To prevent pump cavitation and promote a flow of waste material slurry from a food waste disposer unit into the associated pump, an eductor is connected in fluid communication with an associated one of the disposer units to direct a flow of slurry toward the inlet of the associated pump. In order to minimize the amount of water utilized by the material handling system, the water from which waste material has been at least partially removed by operation of the press is utilized by the eductors to promote a flow of slurry from a disposer to the associated pump.

In one embodiment of the invention, a slurry of waste paper material is supplied to the press from a pulper unit while a pair of garbage disposal units connected in parallel with the pulper unit are effective to supply a slurry of waste food material to the press.

Accordingly, it is an object of this invention to provide a new and improved waste material handling system which includes a plurality of food waste disposer units which are connected in fluid communication with a single press which is effective to extract water from waste material slurry formed by the food waste disposer units.

Another object of this invention is to provide a new and improved waste material handling system as set forth in the preceding object and wherein check valves are utilized to prevent a flow of waste material slurry from one of the disposer units into the other disposer units.

Another object of this invention is to provide a new and improved material handling system as set forth in the preceding objects and wherein pumps are utilized to promote a flow of fluid from the waste disposer units toward the press and wherein an eductor nozzle is utilized to promote a flow of waste material slurry from a food waste disposer unit into an associated pump.

Another object of this invention is to provide a new and improved waste material handling system in which a plurality of food waste disposer units and a pulper or solid waste material disposer unit are connected in fluid communication with a single press.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figures 1, 3:
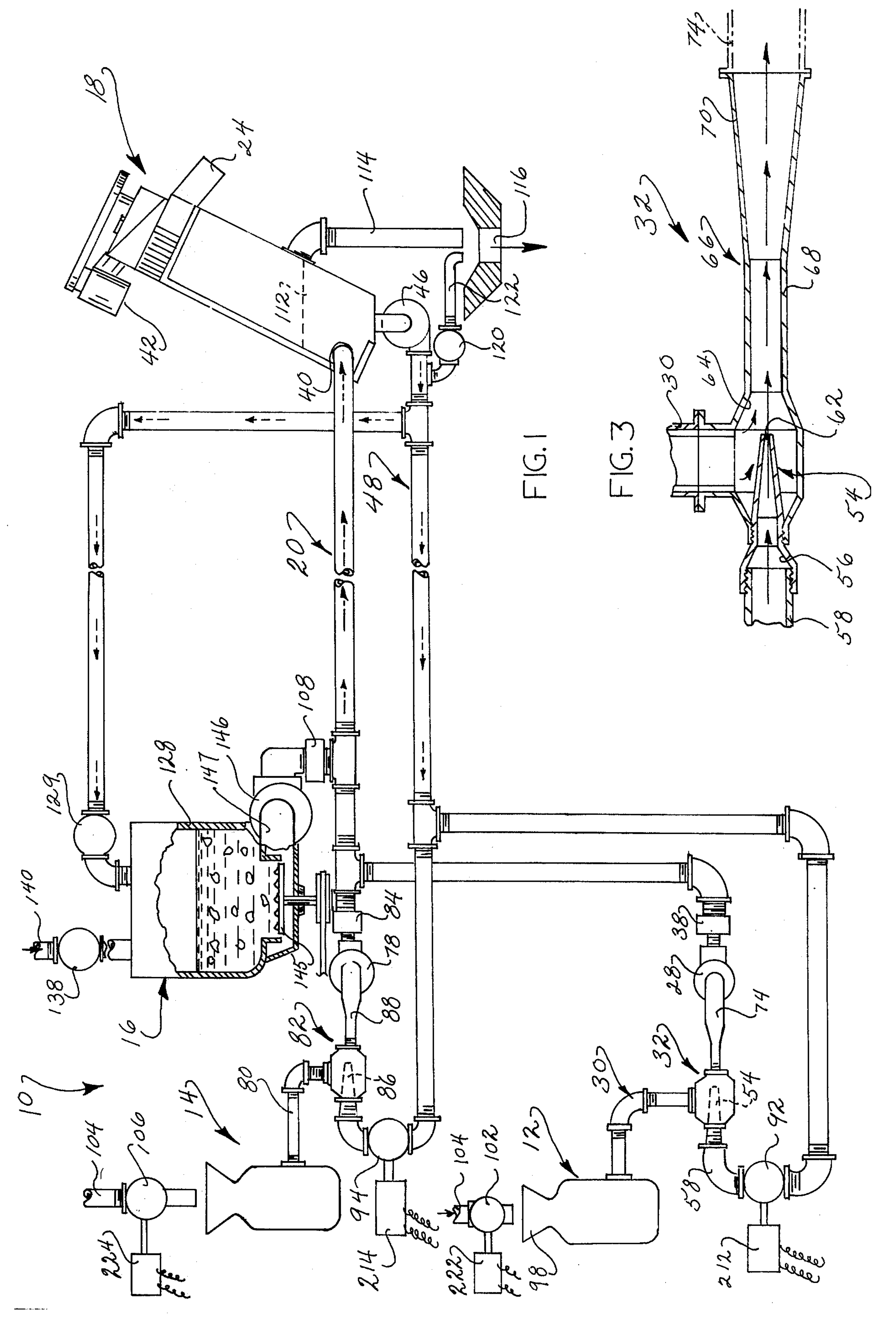
FIG. 1 is a schematic illustration of a waste material handling system constructed in accordance with the present invention and having a plurality of food waste disposer units and a solid waste disposer unit which supply waste material slurry to a press.
FIG. 3 is a sectional view illustrating the construction of an eductor assembly which is associated with one of the food waste disposer units of FIG. 1.

An improved material handling system 10 constructed in accordance with the present invention is illustrated in FIG. 1 and includes a plurality of food waste disposer units 12 and 14 and a pulper or solid waste disposer unit 16 which are connected in parallel fluid communication with a press 18 by a fluid conduit arrangement 20. The food waste disposer units 12 and 14 are garbage grinders and are selectively operable to disintegrate waste food and form a slurry which is supplied to the conduit arrangement 20. The pulper unit 16 is selectively operable to disintegrate solid waste materials and form a slurry which is supplied to the conduit arrangement 20. The press 18 extracts water from the waste material slurries to form a wet pulp which is discharged through a spout or hopper 24 into a suitable bin (not shown). The wet pulp is relatively compact anc can be readily transported to a disposal area.

Figure 2:
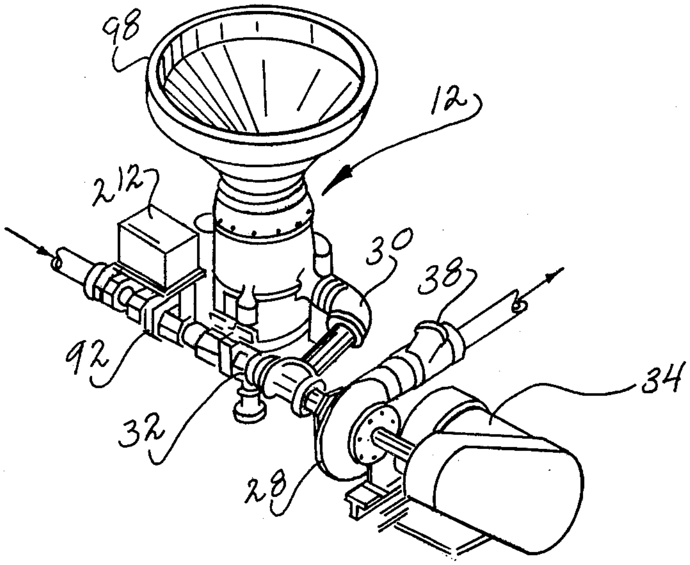
FIG. 2 is a pictorial illustration depicting the relationship between one of the food waste disposer units and an eductor assembly and pump which promote a flow of waste material slurry from the food waste disposer unit toward the press.

The food waste disposer unit 12 (see FIGS. 1 and 2) is connected in fluid communication with a pump 28 through piping 30 and an eductor assembly 32. During operation of the food waste disposer unit 12, air is entrained in the resulting waste food slurry. This air tends to cause cavitation of the pump 28. To prevent cavitation of the pump 28 and to promote a flow of slurry from the food waste disposer unit 12, the eductor assembly 32 directs a flow of liquid and waste food slurry from the disposer unit 12 into the inlet to the pump 28.

The pump 28 is driven by an electric motor 34 (see FIG. 2) to discharge waste material slurry under pressure to the conduit arrangement 20 (FIG. 1) through a check valve 38. This check valve prevents a backflow of liquid from the conduit arrangement 20 to the food waste disposer unit 12. If the check valve 38 was omitted, the food waste disposer unit 12 would tend to discharge a spray of liquid from its intake opening upon initiation of operation of the food waste disposer unit 12. Although the food waste disposer unit 12 could have many different constructions, it is a waste food grinder having a construction similar to that disclosed in U.S. Pat. No. 2,835,554.

The waste material slurry discharged from the pump 28 through the check valve 38 to the conduit system 20 is conducted to the inlet 40 of the press 18. The press 18 is of the well known screw or auger type. The construction of the press 18 is the same as is disclosed in U.S. Pat. No. 3,688,687. During operation of the press 18, a motor 42 causes an auger in the press to rotate and lift the slurry upwardly while squeezing the water from the slurry to form a wet waste material pulp which is discharged through the outlet spout 24.

In order to tend to minimize the amount of water utilized by the material handling system 10, the water extracted from the waste material slurry by the press 18 is conducted to a pump 46 which discharges the water under presure into a second fluid conduit arrangement 48. During operation of the waste food disposer unit 12, the fluid conduit arrangement 48 conducts the water from which all but very small particles of water material have been removed, to the eductor assembly 32. The eductor assembly 32 directs a high speed jet of water from the conduit arrangement 48 toward the inlet of the pump 28 to prevent cavitation of the pump and to promote a flow of waste material slurry through the pipe 30 into the pump 28.

The eductor 32 includes a jet assist nozzle 54 (see FIG. 3) having a relatively large diameter inlet 56 connected with piping 58 of the conduit arrangement 48. The nozzle 54 has a relatively small diameter outlet 62 through which a relatively high speed flow of water pressurized by the pump 46 is directed into a frustroconical inlet port 64 of a venturi tube 66. The venturi tube 66 has a tubular cylindrical portion 68 which connects the inlet 64 with a diverging outlet 70 having a generally frustroconical configuration.

In accordance with well known fluid flow principles, the shape of the venturi tube 66 causes the velocity of the liquid flowing through the venturi tube to increase. Due to this increase in flow velocity and the action of the jet from the nozzle 54, fluid flow from the piping 30 into the inlet 64 of the venturi tube 66 is promoted. This results in waste material slurry being drawn from the disposer 12 (see FIG. 1) into the venturi tube 66 where its flow rate is accelerated. The accelerated flow of waste material slurry is then directed through a conduit or tube 74 into the inlet of the pump 28 (see FIG. 1). The pump 28 discharges the waste material slurry under pressure through the check valve 38 into the conduit arrangement 20 which conducts the waste material slurry to the inlet 40 of the press 18.

The food waste disposer unit 14 is connected with the waste material slurry conducting conduit arrangement 20 and the jet assist water conduit arrangement 48 in the same manner as is the food waste disposer unit 12. Thus, a pump 78 receives waste material slurry conducted from the food waste disposer unit 14 through piping 80 to an eductor 82. The outlet of the pump 78 is connected with the fluid conduit arrangement 20 through a check valve 84 to prevent a backflow of liquid to the food waste disposer unit 14 from the fluid conduit arrangement. The eductor 82 promotes a flow of slurry from the disposer unit 14 and is of the same construction as the eductor 32. The eductor 82 includes a jet assist nozzle 86 which directs a high speed flow of liquid pressurized by the pump 46 into a venturi tube 88. This flow of slurry and liquid is directed into the inlet of the pump 78 to prevent cavitation of the pump.

It is contemplated that one of the food waste disposer units 12 or 14 may be operated while the other disposer unit is inactive. If the inactive food waste disposer unit 12 or 14 was connected directly with the conduit arrangement 48, an objectionable gurgling could occur at the inactive food waste disposer unit during operation of the active food waste disposer unit. To prevent this from occurring, control valves 92 and 94 have been associated with the disposer units 12 and 14. Each of the valves 92 and 94 is operable between a closed position blocking fluid flow from the conduit arrangement 48 to the associated eductor 32 and 82 and an open position in which fluid can flow from the conduit 48 to the associated eductor.

When a food waste disposer unit 12 or 14 is in an inactive condition, the associated control valve 92 or 94 is closed. Upon initiation of operation of a disposer unit 12 or 14, the associated control valve 92 or 94 is opened to enable fluid to flow from the conduit arrangement 48 to the associated eductor. Thus, when the food waste disposer unit 12 is in an active condition and the disposer unit 14 is inactive the control valve 92 is opened to enable relatively high pressure fluid to be supplied to the nozzle 54. At this time, the control valve 94 is closed to block fluid flow from the conduit arrangement 48 to the eductor unit 82.

During operation of the disposer unit 12, solid waste food enters a generally funnel-shaped inlet 98 (see FIGS. 1 and 2) to the disposer unit 12. In addition, a tap or fresh water flow control valve 102 is opened to enable clean water to flow from a conduit 104 into the inlet 98 to the disposer unit 12. The disposer unit 12 breaks up the waste food material and mixes it with the tap water to form a waste food material slurry which is conducted through the piping 30 to the eductor 32 and pump 28. Although this waste food material slurry is, in the illustrated embodiment of the invention, formed by mixing the solid waste food material with tap water, it is contemplated that water removed from the waste material slurry by the press 18 could be conducted from the conduit arrangement 48 through the valve 92 to the disposer unit 12 to reduce the amount of tap water used by the disposer unit 12 in forming the waste food material slurry.

The waste material slurry from the disposer unit 12 and the water supplied from the press 18 to the jet assist nozzle 54 are discharged from the outlet of the pump 28 through the check valve 38 into the fluid conduit arrangement 20. The check valve 84 prevents this waste material slurry from flowing into the pump 78 and back to the disposer unit 14. In addition, a check valve 108 prevents the waste material slurry from flowing from the conduit arrangement into the pulper 16.

The tap or fresh water conduit 104 is also utilized to supply clean water to the food waste disposer unit 14. A tap or fresh water flow control valve 106 is opened to enable clean water to flow from the conduit 104 to the inlet of the food waste disposer unit 14.

If the water removed from the waste material slurry by the press 18 is in excess of the water required during operation of one or more of the disposer units 12, 14 or 16, the excess water accumulates in the press 18 to a level indicated schematically by a dashed line 112 and then flows through a conduit 114 to a drain opening 116. It should be noted that this water is relatively clean and is quite acceptable for discharging in most sewer systems. If the press 18 is to be emptied or drained of water, a drain valve 120 is opened to enable water to flow from the press 18 through the pump 46 to a drain pipe 122.

The pulper or solid waste disposer unit 16 has a tank 128 which is supplied with water from the press 18 through a valve 129. The level of water in the tank 128 can be controlled with a suitable liquid level control apparatus such as disclosed in U.S. Pat. No. 3,780,956 or can be manually controlled if desired. If the flow of water from the press 18 is insufficient to satisfy the demands for water by the pulper 16, a valve 138 can be actuated to enable fresh water to flow through a conduit 140 into the pulper tank 128.

During operation of the pulper 16, waste paper, cardboard boxes, plastic bags, etc., are comminuted or otherwise disintegrated by an impeller 145 at the bottom of the tank 128 to form a slurry of solid waste materials. The impeller 145 is driven through a belt drive arrangement connected with a suitable electric motor to abrade or commute the solid waste in a manner similar to that disclosed in U.S. Pat. No. 3,489,356. The resulting solid waste slurry is conducted to the inlet of the pump 146 through a conduit 147.

The pump 146 is operated to discharge a slurry of solid waste materials through the check valve 108 into the conduit arrangement 20. The solid waste slurry flows to the inlet 40 of the press 18 where water is extracted from the slurry to form a wet paper pulp. The waste slurry from the disposer 16 is prevented from flowing from the conduit arrangement 20 toward the food waste disposers 12 and 14 by the check valves 38 and 84. However, it should be noted that if the food waste disposers 12 and/or 14 are operated during operation of the pulper 16, the waste food slurry from the disposers 12 and/or 14 and the solid waste slurry from the pulper 16 are simultaneously conducted by the conduit arrangement 20 to the press 18. At this time the outlet pressure from the pumps 28, 78 and 146 are sufficient to prevent any backflow of waste material slurry from the conduit arrangement 20 toward the associated disposer units.

Figure 4:
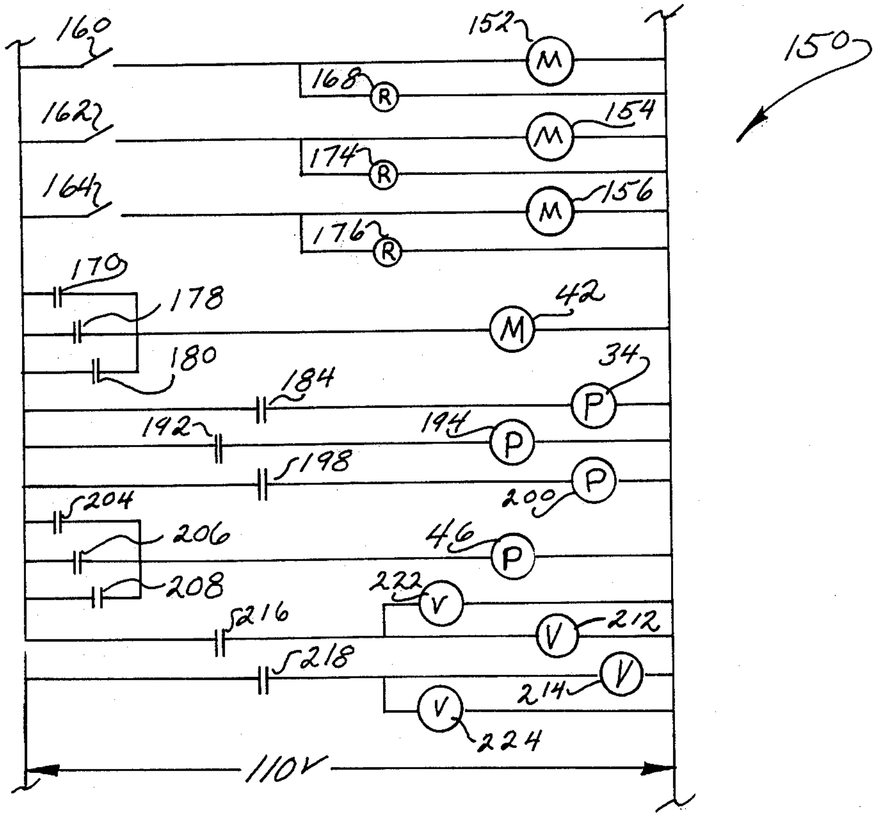
FIG. 4 is a schematic illustration of control circuitry utilized in association with the material handling system of FIG. 1.

The material handling system 10 has electrical control circuitry 150 (see FIG. 4) which is utilized to control the operation of the disposer units 12, 14 and 16 and the press 18. Thus, the electrical circuitry 150 is connected with a motor 152 for driving the grinder or impeller of the food waste disposer 12, a motor 154 for driving the grinder or impeller of the food waste disposer 14, and a motor 156 which is connected with the pulping disc or impeller 145 of the solid waste disposer or pulper 16.

Upon actuation of a start switch 160, 162 or 164 to initiate operation of an associated one of the disposer motors 152, 154 or 156, a relay is actuated to complete a circuit to effect energization of the press drive motor 42. Thus upon closing of the start switch 160 for the food waste disposer unit 12, a relay 168 is energized to close its normally open contacts 170 and complete the energization circuit for the press drive motor 42. Similarly, upon actuation of the start switches 162 and/or 164, relay 174 and/or 176 are energized to close their normally opened contacts 178 and/or 180. Thus, upon initiation of operation of any one of the food waste disposer units 12 or 14 or the solid waste disposer 16, the press drive motor 42 is energized to effect operation of the press 18. It should be noted that all of the disposer units 12, 14 and 16 can be operated simultaneously.

Initiating operation of any one of the disposer units 12, 14, or 16 also initiates operation of the associated waste material slurry pump and the pump 46 for supplying water from the press 18. Thus, closing the start switch 160 results in the energization of the drive motor 152 for the food waste disposer 12 and actuation of the relay 168 to close its normally opened contacts 184. Closing of the relay contacts 184 completes a circuit for energizing the motor 34 (FIG. 2) to drive the pump 28 associated with the disposer 12. Similarly, actuating the start switch 162 (FIG. 4) causes normally open contacts 192 of the relay 174 to close to complete a circuit for energizing a motor 194 which drives the pump 78 connected with the disposer unit 14. Finally, closing the start switch 164 causes normally open contacts 198 of the relay 176 to close to complete a circuit for energizing a motor 200 which drives the pump 146 connected with the pulper 16.

During operation of any one of the disposer units 12, 14 or 16, the pump 46 is driven to supply liquid from the press 18 (FIG. 1). Thus, pressing the start switch 160 (FIG. 4) for the disposer 12 causes normally open contacts 204 of the relay 168 to close to complete a circuit for energizing a motor connected with the pump 46. Similarly, actuating the start switches 162 and 164 causes normally open contacts 206 and 208 of the relays 174 and 176 respectively to close to complete a circuit for the pump drive motor. Thus, during operation of any one of the disposer units 12, 14 or 16, the associated pump 28, 78 or 146 is driven along with the pump 46 to supply fluid from the press 18.

During operation of the food waste disposer unit 12 and/or 14, the associated control valves 92 and/or 94 must be actuated to an open condition. To effect this actuation, control valve motors 212 and 214 (FIG. 1) are energized by closing of normally open contacts 216 and 218 (FIG. 4) associated with the relays 168 and 174 respectively to effect operation of the associated control valve to the open condition. In addition, during operation of the food waste disposer units 12 and/or 14, the valves 102 and/or 106 must be opened to supply fresh water. To accomplish this, control valve motors 222 and 224 (FIG. 1) are energized by closing of normally open contacts 216 and 218 (FIG. 4) to effect operation of the associated valve to the open condition.

In view of the foregoing description it can be seen that a new and improved waste material handling system includes a press 18 which is utilized to extract water from a slurry of waste material supplied to the press through a conduit arrangement 20. A plurality of disposer units 12, 14 and 16 are provided to form a waste material slurry which is conducted to the press by the conduit arrangement 20. Check valves 38, 84 and 108 prevent the slurry from flowing from the conduit arrangement 20 toward an inactive one of the disposer units 12, 14 and 16 upon activation of one or more of the disposer units.

To promote a flow of fluid from the disposer units 12, 14 and 16 to the press 18, pumps 28, 78 and 146 are provided to discharge waste material slurry under pressure through the associated one of the check valves into the conduit arrangement 20. This waste material slurry is then conducted to the inlet 40 of the press where water is extracted from the slurry to form a wet waste material pulp which is discharged from the press to a suitable receiving bin.

The relatively clean water squeezed from the waste material slurry is discharged from the press 18 to a pump 46. The pump 46 directs a relatively high pressure flow of water to the conduit arrangement 48. During operation of the food waste disposer units 12 and/or 14 the associated one of the control valves 92 and/or 94 is opened to enable high pressure liquid to flow from the conduit arrangement 48 to the associated eductors 32 and/or 82. The eductors 32 and/or 82 promote a flow of fluid from the disposer units 12 and/or 14 to the pumps 74 and/or 78. During operation of the solid waste disposer unit 16, fluid extracted from the waste material slurry by the press 18 is supplied to the pulper tank 128 through a control valve 129.

It should be noted that during operation of any or all of the disposer units 12, 14 and 16 the waste material handling system 10 does not discharge waste material slurry into the sewer drain inlet 116. The only time anything is discharged into the sewer drain inlet 116 is when the amount of water extracted from the waste material slurry is in excess of the amount of water utilized by an eductor 32 or 82 and/or in excess of the amount of water required to maintain a desired level in the pulper tank 128. Of course, this excess water is relatively clean since most of the waste material particles have been removed by the press 18. Thus, the waste material handling system 10 prevents the discharge of waste food material slurries directly into the sewage or drain inlet 116 in a manner which may be objectionable.

Having described one specific preferred embodiment of the invention, the following is claimed:

1. A waste material handling system comprising press means for extracting water from a slurry of waste material, a plurality of spaced apart waste food disposer units for forming waste food materials into a slurry of waste material, first conduit means connected in fluid communication with said press means and said waste food disposer units for conducting waste material slurry discharged from each of said waste food disposer units to said press means, a plurality of check valve means each of which is connected with said first conduit means at a location adjacent an associated one of said waste food disposer units for blocking the flow of liquid in said first conduit means in a direction toward the associated one of said waste food disposer units and for enabling liquid to flow in said first conduit means in a direction away from the associated one of said waste food disposer units, and a plurality of slurry flow promoting means connected with said first conduit means at a location adjacent an associated one of said waste food disposer units for promoting a flow of waste material slurry from the associated one of said waste food disposer units to said press means.

2. A waste material handling system as set forth in claim 1 wherein said slurry flow promoting means including a plurality of pump means each of which is associated with one of said waste food disposer units for receiving waste material slurry from the associated one of said waste food disposer units and discharging waste material slurry into said first conduit means under pressure to thereby promote a flow of the slurry of waste material slurry from the associated one of said waste food disposer units to said press means.

3. A waste material handling system as set forth in claim 2 further including control means for effecting activation of said press means and one of said plurality of pump means upon initiation of operation of the disposer means associated with said one of said plurality of pump means.

4. A waste material handling system as set forth in claim 2 wherein said slurry flow promoting means includes a plurality of nozzle means each of which is connected in fluid communication with an associated one of said pump means for directing a flow of liquid toward an inlet of the associated one of said pump means to promote a flow of waste material slurry from one of said waste food disposer units to the associated one of said pump means.

5. A waste material handling system as set forth in claim 4 further including second conduit means for conducting from said press means to each of said nozzle means liquid from which waste materials have been at least partially removed by said press means.

6. A waste material handling system as set forth in claim 5 further including a plurality of control valve means each of which is connected with said second conduit means and associated with one of said nozzle means and pump means, each of said control valve means being operable between an open condition enabling liquid to flow through said second conduit means to the associated one of said nozzle means and a closed condition blocking the flow of liquid to the associated one of said nozzle means.

7. A waste material handling system as set forth in claim 6 further including control means for effecting activation of said press means, one of said pump means and operation to the open condition of the one of said control valve means associated with said one of said pump means upon initiation of operation of the waste food disposer unit associated with said one of said pump means.

8. A waste material handling system as set forth in claim 7 further including third conduit means for conducting fresh water to each of said waste food disposer units and a plurality of fresh water control valves connected with said third conduit means, each of said fresh water control valves being associated with one of said waste food disposer units and being operable between an open condition enabling fresh water to flow through said third conduit means to the associated one of said waste food disposer units and a closed condition blocking fresh water flow through said third conduit means to the associated one of said waste food disposer units, said control means including means for effecting operation to the open condition of the fresh water control valve associated with one of said waste food disposer units upon initiation of operation of the one waste food disposer unit.

9. A waste material handling system comprising press means for extracting water from a slurry of waste material, a plurality of spaced apart waste food disposer units for forming food waste materials into waste material slurry, at least one pulper unit for forming solid waste material into a waste material slurry, first conduit means connected in fluid communication with said waste food disposer units, said pulper unit and said press means for conducting waste material slurry discharged from each of said waste food disposer units and said pulper unit to said press means, a plurality of check valve means connected with said first conduit means and with said waste food disposer units and said pulper unit for blocking the flow of liquid in said first conduit means in a direction toward the said waste food disposer units and said pulper unit and for enabling liquid to flow in said first conduit means in a direction away from said waste food disposer units and said pulper unit, a plurality of first pump means connected with said first conduit means and with said waste food disposer units and said pulper unit for receiving waste material slurry from said waste food disposer units and pulper unit and for discharging waste material slurry into said first conduit means under pressure to promote a flow of the waste material slurry from said waste food disposer units and said pulper unit to said press means, a plurality of nozzle means each of which is connected with an associated one of said first pump means for directing a flow of liquid toward an inlet of the associated one of said first pump means to promote a flow of waste material slurry to the associated one of said first pump means, second conduit means connected in fluid communication with each of said nozzle means and with said press means for conducting from said press means to each of said nozzle means liquid from which waste materials have been at least partially removed by said press means, second pump means connected with said second conduit means for promoting a flow of liquid in said second conduit means, and a plurality of control valve means each of which is connected with said second conduit means and associated with one of said nozzle means, each of said control valve means being operable between an open condition enabling liquid to flow through said second conduit means to the associated one of said nozzle means and a closed condition blocking the flow of liquid to the associated one of said nozzle means.

10. A waste material handling system as set forth in claim 9 wherein each of said waste food disposer units includes a motor, said material handling system further including a plurality of first motor means each of which is connected with an associated one of said first pump means for driving the associated one of said first pump means and a second motor means which is connected with said second pump means for driving said second pump means, and control means for effecting activation of one of said first motor means and said second motor means upon initiation of operation of the motor in the waste food disposer unit which is associated with the one of said plurality of first pump means which is driven by said one of said first motor means.

11. A waste material handling system comprising press means for extracting water from a slurry of waste material, first motor means connected with said press means for driving said press means, a plurality of spaced apart waste food disposer units for forming food waste materials into waste material slurry, a plurality of second motor means each of which is connected with an associated one of said waste food disposer units for driving the associated one of said waste food disposer units, at least one pulper unit for forming solid waste material into a waste material slurry, third motor means connected with said pulper unit for driving said pulper unit, first conduit means connected in fluid communication with said waste food disposer units, said pulper unit and said press means for conducting waste material slurry discharged from said waste food disposer units and said pulper unit to said press means, a plurality of check valve means connected with said first conduit means and with said waste food disposer units and said pulper unit for blocking the flow of liquid in said first conduit means in a direction toward the said waste food disposer units and said pulper unit and for enabling liquid to flow in said first conduit means in a direction away from said waste food disposer units and said pulper unit toward said press means, a plurality of first pump means connected with said first conduit means and associated with said waste food disposer units and said pulper unit for receiving waste material slurry from said waste food disposer units and pulper unit at a relatively low pressure and for discharging waste material slurry at a relatively high pressure to thereby promote a flow of the waste material slurry from said waste food disposer units and said pulper unit to said press means through said first conduit means, a plurality of fourth motor means each of which is connected with an associated one of said first pump means for driving the associated one of said first pump means, a plurality of nozzle means each of which is connected in fluid communication with an associated one of said first pump means for directing a flow of liquid toward an inlet of the associated one of said first pump means to promote a flow of waste material slurry to the associated one of said first pump means, second conduit means connected with said nozzle means and with said press means for conducting from said press means to each of said nozzle means liquid from which waste materials have been at least partially removed by said press means, second pump means connected with said second conduit means for promoting a flow of liquid in said second conduit means, fifth motor means connected with said second pump means for driving said second pump means, a plurality of first valve means each of which is connected with said second conduit means and associated with one of said nozzle means and waste food disposer units, each of said first valve means being operable between an open condition enabling liquid to flow through said second conduit means to the associated one of said nozzle means and a closed condition blocking the flow of liquid to the associated one of said nozzle means, third conduit means connected in fluid communication with said waste food disposer units for conducting fresh water to each of said food waste disposer units, a plurality of second valve means each of which is connected with said third conduit means and associated with one of said waste food disposer units, each of said second valve means being operable between an open condition enabling fresh water to flow through said third conduit means to the associated one of said waste food disposer units and a closed condition blocking the flow of fresh water to the associated one of said waste food disposer units, control means for initiating operation of a selected one of said waste food disposer units and said press, said control means including selectively actuatable means for initiating operation of the one of said plurality of second motor means which is associated with the selected one of said waste food disposer units to drive the selected one of said waste food disposer units while maintaining other motor means in said plurality of second motor means in an inactive condition, means for initiating operation of said first motor means to drive said press means upon initiation of operation of the selected one of said waste food disposer units, means for initiating operation of the one of said fourth plurality of motor means which is connected with the one of said first plurality of pump means which is associated with the selected one of said waste food disposer units to drive the one of said first plurality of pump means which is associated with the selected one of said waste food disposer units upon initiation of operation of the selected one of said waste food disposer units while maintaining other motor means of said fourth plurality of motor means in an inactive condition, means for initiating operation of said fifth motor means to drive said second pump means upon initiation of operation of the selected one of said waste food disposer units, means for effecting operation from the closed condition to the open condition of the one of said plurality of first valve means associated with the selected one of said waste food disposer units to enable liquid to flow from said second conduit means to the one of said nozzle means associated with the selected one of said waste food disposer units upon initiation of operation of the selected one of said waste food disposer units while maintaining other valve means of said plurality of first valve means in a closed condition, and means for effecting operation from the closed condition to the open condition of the one of said plurality of second valve means associated with the selected one of said waste food disposer units to enable fresh water to flow from said third conduit means to the selected one of said plurality of waste food disposer units upon initiation of operation of the selected one of said waste food disposer units while maintaining other valve means of said plurality of second valve means in a closed condition.

* * * * *